United States Patent

[11] 3,627,779

| [72] | Inventor | Richard A. Sandstedt<br>Flint, Mich. |
|---|---|---|
| [21] | Appl. No. | 783,399 |
| [22] | Filed | Dec. 12, 1968 |
| [45] | Patented | Dec. 14, 1971 |
| [73] | Assignee | E. I. du Pont de Nemours and Company<br>Wilmington, Del. |

[54] SEALER OR PRIMER COMPOSITION OF AN ACRYLIC POLYMER HAVING ADHESION PROMOTING GROUPS AND AN EPOXY RESIN
3 Claims, No Drawings

[52] U.S. Cl. .................................................... 260/31.8 M,
117/132 BE
[51] Int. Cl. ...................................................... C08f 45/38
[50] Field of Search ............................................ 260/31.8
ME, 837, 80.73, 86.1 N

[56] References Cited
UNITED STATES PATENTS

| 2,949,445 | 8/1960 | Blake | 260/80.73 X |
|---|---|---|---|
| 3,008,914 | 11/1961 | Fry | 260/837 X |
| 3,037,006 | 5/1962 | Hankins et al. | 260/87.5 E X |
| 3,060,148 | 10/1962 | Evans et al. | 260/31.8 X |
| 3,231,533 | 1/1966 | Garrett et al. | 260/80.73 X |
| 3,301,801 | 1/1967 | Gaske et al. | 260/837 X |

Primary Examiner—Morris Liebman
Assistant Examiner—L. T. Jacobs
Attorney—Hilmar L. Fricke ABSTRACT: A sealer composition or a primer composition that is used for the repair of a painted or an unpainted metal substrate having excellent adhesion to the substrate that has as the film-forming constituents 1. at least 50 percent by weight, based on the weight of the film-forming constituent, of an acrylic polymer of an acrylic ester that is an alkyl methacrylate or an alkyl acrylate in which the acrylic polymer has adhesion promoting groups attached to the polymer backbone;
2. at least 5 percent by weight of an epoxy resin; and
3. 0–40 percent by weight of an organic plasticizer.

SEALER OR PRIMER COMPOSITION OF AN ACRYLIC POLYMER HAVING ADHESION PROMOTING GROUPS AND AN EPOXY RESIN

BACKGROUND OF THE INVENTION

This invention is related to a coating composition, and more specifically to sealer and primer composition used as a subcoat in the repair of finishes on auto and truck bodies.

Sealer and primer composition are well known in the art, for example, Melamed U.S. Pat. No. 2,992,132, issued July 11, 1961, illustrates thermosetting primer coating compositions. Other coating compositions shown in Blake U.S. Pat. No. 2,949,445, issued Aug. 16, 1960, Hurwitz U.S. Pat. No. 2,954,358, issued Sept. 27, 1960 and Hankins et al. U.S. Pat. No. 3,037,006, issued May 29, 1962, illustrate coating compositions that can be used as sealer and primer compositions. However, these prior art compositions, while very useful, do not have the combination of properties, such as adhesion to unprimed metal and enamel or lacquer coatings along with rapid air dry properties, which are desirable for a sealer and primer composition.

The novel composition of the invention will adhere to an alkyd or acrylic enamel finish or to an unprimed metal substrate and air dries in a relatively short period to a tough, durable film. Moreover, a variety of topcoats have excellent adherence to the dried novel coating composition of this invention, such as, thermosetting acrylic enamels, alkyd enamels, lacquers of polymethyl methacrylate, nitrocellulose lacquers, and even coatings of polyvinyl chloride. These topcoats exhibit excellent weatherability, chip and crack resistance indicating that the novel sealer composition has excellent adhesion to the substrate.

SUMMARY OF THE INVENTION

The liquid coating composition contains 50–50 percent by weight of film-forming constituents and a solvent for the film-forming constituents in which the film-forming constituents consist essentially of 1. at least 50 percent by weight, based on the weight of the film-forming constituents, of an acrylic polymer consisting essentially of 0–5 percent by weight, based on weight of the acrylic polymer, of an α, β-ethylenically unsaturated monocarboxylic acid; an acrylic ester which is either an alkyl methacrylate, an alkyl acrylate or a mixture thereof, wherein the alkyl group contains 1–8 carbon atoms, and up to 50 percent by weight of the acrylic polymer contains adhesion promoting groups which are attached to the backbone of the acrylic polymer by replacing the —OH of the pendent carboxyl group, wherein the adhesion promoting group is selected from the group consisting of

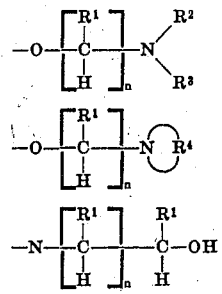

wherein $n$ is 1 to 2, $R^1$, $R^2$ and $R^3$ are each selected from the group of hydrogen, an alkyl group having 1–4 carbon atoms and an aryl group, $R^4$ is either a heterocyclic group or a divalent aromatic radical;

2. at least 5 percent by weight, based on the weight of the film-forming ingredients of an epoxy resin of the following structural formula

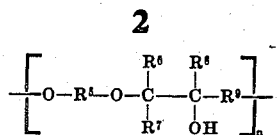

wherein $n$ is an integer sufficient to provide the epoxy resin with a molecular weight of at least 20,000; $R^5$ is a divalent aromatic radical; $R^6$, $R^7$ and $R^8$ are each selected from the group of hydrogen and an alkyl radical having 1–5 carbons atoms; $R^9$ is an alkylene group having 1–5 carbon atoms; and 3. 0–40 percent by weight, based on the weight of the film-forming constituents, of an organic plasticizer.

DESCRIPTION OF THE INVENTION

Preferably, the novel coating composition of this invention has a solids content of the film-forming constituents of about 10–20 percent by weight and the film-forming constituents consist essentially of 55–75 percent by weight of the acrylic polymer, 10–30 percent by weight of the epoxy resin and 20–40 percent of an organic plasticizer.

The acrylic polymer used in the novel coating composition of this invention contains about 0–5 percent by weight of an α, β-ethylenically unsaturated monocarboxylic acid. Typically useful α, β-ethylenically unsaturated monocarboxylic acids used in the acrylic polymer are acrylic acid, methacrylic acid, crotonic acid and the like. Preferred are acrylic acid and methacrylic acid since these acids form high quality polymers.

The acrylic polymer contains about 50–99 percent by weight of an alkyl methacrylate ester or an alkyl acrylate ester or a mixtures of these esters. The alkyl group of the aforementioned esters contains 1–8 carbon atoms and is of a lower alkyl monohydric alcohol. Typical esters used for the acrylic polymer are methyl methacrylate, ethyl methacrylate, propyl methacrylate, isopropyl methacrylate, butyl methacrylate, octylmethacrylate, ethyl acrylate, propyl acrylate, isopropyl acrylate, butyl acrylate, isobutyl acrylate, hexyl acrylate, 2-ethylhexyl acrylate and the like.

Up to 50 percent by weight of the acrylic polymer can be contributed by the monomers having adhesion promoting groups. Generally, these adhesion promoting monomers have sites of ethylenically unsaturation which can by polymerized into acrylic monomer backbone. One method of preparing these monomers is to react one of the aforementioned α, β-ethylenically unsaturated monocarboxylic acids and a constituent containing an adhesion promoting group. Then this monomer is polymerized with the other acrylic esters to form an acrylic polymer.

Typical monomers which provide adhesion promoting groups to the acrylic polymer are hydroxyaminopropyl methacrylate, aminoethyl methacrylate, diethylaminoethyl methacrylate, dimethylaminoethyl methacrylate, 2-aminopropyl methacrylate, 2-aminoethyl methacrylate, t-butylaminethyl methacrylate, 2-(1-aziridinyl)-ethyl methacrylate, n-2-hydroxypropyl-methacrylamide and n-2-hydroxyethylemethacrylamide.

The preparation of the hydroxy amino propyl methacrylate is disclosed in U.S. Pat. Nos. 2,949,383 and 2,949,445, both issued on Aug. 16, 1960, which are incorporated by reference.

The 3-amino-3-hydroxypropyl methacrylate is prepared by reacting methacrylic acid with 2(1-aziridinyl)ethanol.

The 2-aminopropyl methacrylate and 2-aminoethyl methacrylate are prepared by reacting methacrylic acid with ethylene amine and propylene amine respectively.

The following are examples of typical acrylic polymers having adhesion promoting groups suitable for use with this invention: 97/3–99/1 copolymer of methyl methacrylate/hydroxyaminopropyl methacrylate; 95/3/2 terpolymer of methyl methacrylate/methacrylic acid/3-amino 3-hydroxypropyl methacrylate; 50/50–99/1 copolymer of methyl methacrylate/diethyl-aminoethyl methacrylate; 75/25–99/1 copolymer of methyl methacrylate/2-aminopropyl methacrylate; 75/25/–99/1 copolymer of methyl methacrylate/2-aminoethyl methacrylate; 50/50–99/1 copolymer of methyl methacrylate/2-(1-aziridinyl)-ethyl methacrylate; 50/50–99/1 copolymer of methyl methacrylate/t-butylaminoethyl methacrylate; 50/50–99/1 copolymer of methyl methacrylate/dimethylaminoethyl methacrylate; 90/10–99/1 copolymer of methyl methacrylate/N-2-hydroxypropyl methacrylamide; 90/10–99/1 copolymer of methyl methacrylate/N-2-hydroxy-ethyl methacrylamide.

One particularly preferred adhesion promoting group is provided by a monomer having the formula

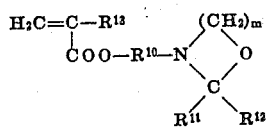

wherein m is an integer having a value of 2 to 3, $R^{13}$ is selected from hydrogen, methyl, ethyl. $R^{10}$ is selected from $C_1$ to $C_5$ alkylene groups, and $R^{11}$ and $R^{12}$ are selected from (1) separate groups selected individually from (a) hydrogen, phenyl, benzyl and $C_1$ to $C_{12}$ alkyl groups in the case of $R^{11}$ and (b) hydrogen and $C_1$ to $C_4$ alkyl groups in the case of $R^{12}$, and (2) a single group selected from pentamethylene and tetramethylene which, together with the carbon atom to which the single group is attached, forms a carbocyclic group.

The aforementioned adhesion promoting monomer used in the acrylic polymer of this invention is prepared according to the procedure described in the aforementioned U.S. Pat. No. 3,037,006, the disclosure of which is incorporated by reference. An especially preferred embodiment of this adhesion promoting monomer used in the acrylic polymer of this invention is of the formula

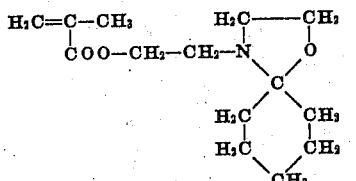

It will be apparent to those skilled in the art that this monomer can be referred to as (1) 3-($\beta$-methacryloxyethyl)-2,2-penta-methylene-oxazolidine; (2) 3-(2-methacryloxyethyl)-2,2-spiro-cyclohexyl-oxazolidine; (3) MESO or (4) 1-oxa-4-(2'-methacryloxy-ethyl)-4-azaspiro [4.5] decane.

One particularly preferred acrylic polymer used in the novel composition of this invention contains about 90–99 percent by weight methyl methacrylate and about 1–10 percent by weight of 3-(2-methacryloxyethyl)-2,2-spirocyclohexyl oxazolidine.

The molecular weight of the acrylic polymers having adhesion promoting groups in general ranges from about 30,000–150,000. The preferred range is about 50,000–70,000 since the polymers have a good viscosity property in this range.

The acrylic polymer having the pendent adhesion promoting groups is prepared by conventional polymerization techniques in which the monomer constitutes are blended with a solvent and a polymerization catalyst and heated to about 75°–100° C. for about 2–6 hours to form a polymer within the aforementioned molecular weight range.

Typical solvents and diluents which are used to prepare the acrylic polymer and the novel coating composition of the invention are toluene, xylene, butyl acetate, acetone, methylisobutyl ketone, methylethyl ketone, butyl alcohol, and other aliphatic cycloaliphatic and aromatic hydrocarbons, esters, ethers, ketones, and alcohols, such as are conventionally used in coating compositions.

About 0.1–4 percent weight, based on the weight of the monomers, of a polymerization catalyst is used to prepare the acrylic polymer. Typical catalysts are ditertiary butyl peroxide, cumene hydroperoxide, azobisisobutyronitrile and the like.

The epoxy resins useful for the sealer compositions of this invention are high in molecular weight. In general, they have the structural formula,

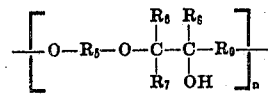

wherein, n is an integer sufficient to provide the epoxy resin with a molecular weight of at least about 20,000, $R_5$ is a divalent aromatic radical; $R_6$, $R_7$ and $R_8$ are individually selected from the group of hydrogen and a $C_1$ to $C_5$ alkyl, $R_9$ is a $C_1$ to $C_5$ alkylene group. $R_5$ as shown above, can be a bisphenol A or a bisphenol F, both of which can be substituted. Bisphenol A is para, para-isopropylidene diphenol. Bisphenol F is 4,4'dihydroxydiphenyl methane. Suitable substituents include $C_1$ to $C_5$ alkyls, halogens such as chlorine, bromine, and fluorine, and $C_1$ to $C_5$ alkoxy groups.

The preferred epoxy resin is the reaction product of epichlorohydrin-bisphenol A which has the structural formula,

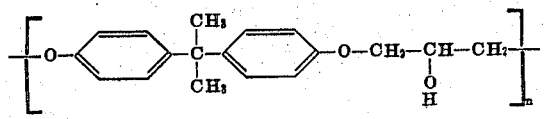

where n is the same as above. Epichlorohydrin-bisphenol A is preferred because it readily forms films which have a balance of desired physical properties such as high tensile strength toughness, good elongation, does not become brittle at low temperatures, and has good chemical resistance.

Another very useful high molecular weight epoxy resin is epichlorohydrin-bisphenol F which has the structural formula

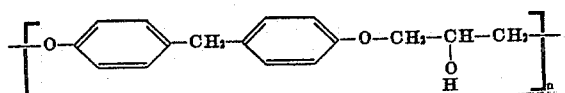

where n is as defined above.

Epoxy resins used with this invention must be high enough in molecular weight so that the films formed are flexible and nonbrittle; molecular weights of about 20,000 are generally sufficient. Higher molecular weights are preferred up to and beyond 200,000.

Plasticizers can be used in the coating composition of this invention to impart desirable properties to the coating such as epoxidized soya bean oil, oil-free and oil modified alkyds and polyesters, such as, polyorthophthalate esters, polyalkylene adipate esters or polyarylene adipate esters, benzylbutyl phthalate, dibutyl phthalate, triphenyl phosphate, 2-ethylhexylbenzyl phthalate, dicyclohexyl phthalate, diallyl phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyltributyl citrate, dibenzyl sebacate, tricesyl phosphate, toluene ethyl sulfonamide, the di-2-ethylhexyl ester of hexamethylene diphthalate, di(methylcyclohexyl)phthalate. One preferred plasticizer is benzylbutyl phthalate.

One preferred composition has a film forming solids content of about 10–20 percent by weight and about 50–75 percent by weight of the film forming constituents, of an acrylic polymer of 90–99 percent by weight, based on weight of the acrylic polymer of methyl methacrylate and 1–10 percent by weight of 3-(2-methacryloxyethyl)-2,2-spirocyclohexyloxayolidine; 10–30 percent by weight of an epoxy resin of epichlorohydrin para,para-isopropylidenediphenol having a molecular weight of about 20,000–200,000; 20–40 percent by eight of benzylbutyl phthalate.

Pigments are used in the novel coating composition of this invention in the amounts of 0.1–50.0 percent pigment volume concentration, preferably, a pigment volume concentration of about 0.3–6.0 percent is used for a sealer composition. Primer composition preferably have a pigment volume concentration of 20–45 percent. Examples of the great variety of pigments which are used in the novel coating composition of this invention are metallic oxides, preferably titanium dioxide, zinc oxide, iron oxide and the like, metal hydroxides, metal flakes, chromates, such as lead chromate, sulfides, sulfates, carbonates, carbon black, silica, talc, china clay, organic dyes and lead, iron blues, organic reds, maroons, and the like, organic dyes and lakes, etc.

The novel compositions of this invention can be applied to a variety of substrates, for example, metal, glass, plastics, such as styrene copolymers of styrene, and the like, by any of the usual application methods, such as spraying, dipping, brushing, flow coating and the like. These coatings can be air dried or baked at about 93–150° C. to increase the drying rate. The resulting coating is about 0.1–5 mils thick, preferably, 1–3 mils thick and can be sanded, if desired, to improve smoothness.

The characteristics of the novel composition of this invention that make the composition useful particularly in refinishing or repairing the finishes of autos and trucks is the rapid air drying characteristic and excellent adhesion to bare or treated metal, or metals previously painted with alkyd or acrylic enamels. Also, the novel composition can be highly pigmented or used as a clear sealer coat. After application of the novel composition only a short air dry period is required before a topcoat can be applied. Topcoats of lacquer and enamels have excellent adherence to the novel dried sealer or primer coat of this invention and have excellent durability and weatherability.

The following examples the invention.

EXAMPLE 1

Polymer A solution is prepared for use in a sealer composition as follows:

| Portion 1 | Parts By Weight |
|---|---|
| Methyl methacrylate (MMA) monomer | 2,283.2 |
| Polymer intermediate solution—15% solution of 3-(2-methacryloxyethyl)-2,2-spirocyclohexyl oxazolidine (MESO) in methyl methacrylate monomer | 1,113.9 |
| Acetone | 1,106.9 |
| Toluene 3,577.2 | |
| Azobisisobutyronitrile | 17.0 |
| Portion 2 | |
| Azobisisobutyronitrile | 4.2 |
| Acetone | 24.2 |
| Toluene | 86.5 |
| Total | 8,213.1 |

Portion 1 is charged into a reaction vessel equipped with a stirrer and a condenser and the ingredients are heated to 72° C. and held at 80–85° C. Portion 2 is premixed and charged into the reaction vessel and the ingredients are refluxed for about 4–5 hours at 80° C. until the reaction mixture reaches a Gardner Holdt viscosity of about V-Z measured at 25° C. The resulting polymer solution has a polymer solids content of about 40 percent and polymer A has a composition of MMA/MESO in a weight of ratio of 95/5.

A sealer composition is prepared by blending the following ingredients:

| Portion 1 | Parts By weight |
|---|---|
| Polymer A solution (40% solids) | 967.8 |
| Titanium dioxide pigment dispersion (58% Titanium dioxide pigment dispersed in polymer A solution) | 540.0 |
| Portion 2 | |
| Ethylene glycol monoethyl ether | 1,256.2 |
| Toluene | 1,813.2 |
| Isopropanol | 1,904.8 |
| Portion 3 | |
| Butylbenzyl phthalate | 171.1 |
| Epoxy resin* solution (40% polymer solids in methyl ethyl ketone having a Gardner Holdt viscosity at 25° C. of about Z 4) | 500.3 |
| Total | 7,153.4 |

*Epoxy resin is a high molecular weight bisphenol A type epoxy resin of the formula

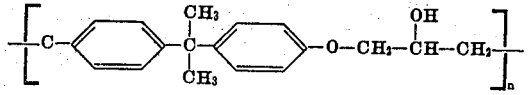

Portion 1 is charged into a sand mill and ground to a 0.5 mil fineness. Portion 2 is premixed and charged into the mixer containing Portion 1 and thoroughly mixed. Portion 3 is then added and the composition is thoroughly mixed to give a sealer composition that has a viscosity of 27 seconds in a No. 7 Parlin cup measured at 25° C.

The above sealer composition is sprayed onto five suitably primed steel panels coated with polymethyl methacrylate lacquer, five suitably primed panels coated with a thermosetting acrylic enamel and five steel panels in which there is a strip of untreated steel and the remainder of the panel is coated with a primer and a thermosetting acrylic topcoat which illustrates a typical substrate which has been repaired by conventional techniques. In each case, about a 0.5 mil tick coat is applied to the panel and air dried for about 35–45 minutes. In each case, the adhesion of the coating composition to the substrate is excellent. Adhesion of the sealer is determined by applying a strip of scotch tape to the coating, smoothing the tape to firmly adhere to the coat and then removing the tape. In case case, none of the sealer is removed indicating excellent adhesion.

Each of the above panels is lightly sanded and a coating of a conventional polymethyl methacrylate lacquer is applied and air dried. In each case, the lacquer has excellent adhesion to the sealer as determined by the aforementioned test.

EXAMPLE 2

A pigment dispersion which is to be used in a sealer composition is prepared by blending the following ingredients:

| Portion 1 | Parts By Weight |
|---|---|
| Polymer A solution (40% solids—prepared in Example 1) | 130.0 |
| Toluene | 180.0 |
| Magnesium silicate pigment | 81.7 |
| Barytes pigment | 152.3 |
| Titanium dioxide pigment | 152.0 |
| Talc | 68.8 |
| Finely divided silica | 165.2 |
| Carbon Black pigment | 10.0 |

| Portion 2 | |
|---|---|
| Polymer A solution (same as above) | 40.0 |
| Toluene | 20.0 |
| Total | 1,000.0 |

Portion 1 is charged into a sand mill and ground to a 0.5 mil fineness. Portion 2 is then thoroughly mixed with Portion 1. The resulting pigment dispersion has a pigment volume concentration of about 30 percent.

A sealer composition is formed by blending the following ingredients:

| | Parts By weight |
|---|---|
| Pigment dispersion (prepared as above) | 100.0 |
| Polymer A solution—(40% polymers solids—prepared in example 1) | 50.5 |
| Ethylene glycol monoethyl ether acetate | 15.5 |
| Ethylene glycol monoethyl ether | 77.4 |
| Toluene | 88.4 |
| Anhydrous isopropanol | 108.3 |
| Epoxy resin solution (40% polymers solids) (described in example 1) | 29.7 |
| Total | 469.8 |

The above ingredients are charged into a reaction vessel and thoroughly mixed. The resulting sealer composition has a viscosity of 27 seconds in a No. 7 Parlin cup at 25° C.

The above sealer composition is sprayed onto 5 suitably primed steel panels coated with polymethylmethacrylate lacquer, 5 suitably primed panels coated with a thermosetting acrylic enamel and 5 steel panels in which there is a strip of untreated steel and the remainder of the panel is coated with a primer and a thermosetting acrylic topcoat which illustrates a typical substrate which has been repaired by conventional techniques. In each case, about a 0.5 mil thick coat is applied and air dried for about 35-45 minutes. In each case, the adhesion of the coating composition to the substrate is excellent. Adhesion of the sealer is determined by applying a strip of scotch tape to the coating, smoothing the tape to firmly adhere to the coat and then removing the tape. In each case, none of the sealer is removed indicating excellent adhesion.

Each of the above panels is lightly sanded and a coating of a conventional polymethyl methacrylate lacquer is air dried. In each case, the lacquer has excellent adhesion to the sealer as determined by the aforementioned test.

EXAMPLE 3

The sealer compositions prepared in examples 1 and 2 are field tested on autos which are subjected to conventional use and weathering. In each case, the coating did not crack, chip or peel and retained its adhesion to the substrate, even after long periods of use and severe weathering. The following table shows the various types of original finishes over which the sealer composition of example 1 or 2 is applied, a finish topcoat is applied over the sealer after it is thoroughly dried.

TABLE

| Auto number | Original finish | Sealer composition | Finish topcoat |
|---|---|---|---|
| 1 | Thermosetting alkyd melamine enamel | Example 1 | Air dry alkyd enamel. |
| 2 | " | " | " |
| 3 | " | " | " |
| 4 | Thermosetting acrylic enamel | do | Thermosetting acrylic enamel. |
| 5 | do | do | Spot repair enamel prepared according to Example 1 of S.N. 491,815, filed Sept. 30, 1965. |
| 6 | do | do | Do. |
| 7 | Polymethyl methacrylate lacquer | do | Do. |
| 8 | Polymethyl methacrylate lacquer | Example 2 | Air dry alkyd enamel. |
| 9 | " | " | " |
| 10 | Thermosetting alkyd melamine enamel | do | Textured block polyvinyl chloride finish (roof of a truck). |
| 11 | " | " | " |

I claim:
1. A liquid coating composition that can be air dried comprising 10-20 percent by weight of film-forming constituents and a solvent for said constituents in which the film-forming constituents consist essentially of
   1. about 50-75 percent by weight, based on the weight of the film-forming constituents, of an acrylic polymer consisting essentially of 90-99 percent by weight of methyl methacrylate, and correspondingly, 1-10 percent by weight of 3-(2-methacryloxyethyl)-2,2-spiro-cyclohexyl oxazolidine;
   2. about 10-30 percent by weight, based on the weight of the film-forming constituents, of an epoxy resin having the following structural formula

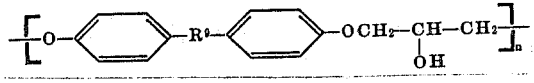

wherein $R^9$ is selected from the group consisting of

sufficiently large to provide the epoxy resin with a molecular weight of about 20,000 to 200,000;
   3. about 20-40 percent by weight, based on the weight of the film-forming constituents, of a phthalate ester plasticizer.
2. The coating composition of claim 1 in which the plasticizer is butyl benzyl phthalate.
3. A metal substrate coated with a dried coalesced layer of the composition of claim 1.

UNITED STATES PATENT OFFICE
CERTIFICATE OF CORRECTION

Patent No. U.S.P. 3,627,779        Dated December 14, 1971

Inventor(s) Richard A. Sandstedt

It is certified that error appears in the above-identified patent and that said Letters Patent are hereby corrected as shown below:

Claim 1, column 8, line 55, after the formula $$"\ \begin{array}{c} CH_3 \\ | \\ -C- \\ | \\ CH_3 \end{array}\ "$$

the following should be added -- and $-CH_2-$ and n is a positive integer --

Signed and sealed this 25th day of April 1972.

(SEAL)
Attest:

EDWARD M. FLETCHER, JR.
Attesting Officer

ROBERT GOTTSCHALK
Commissioner of Patents